United States Patent Office 2,908,580
Patented Oct. 13, 1959

2,908,580

END SEAL FOR ELECTRICAL HEATING ELEMENTS

William C. Stetson, Saxonburg, Pa., assignor to Saxonburg Ceramics, Saxonburg, Pa.

No Drawing. Application March 29, 1957
Serial No. 649,308

2 Claims. (Cl. 106—46)

The present invention is related to ceramic materials and is more particularly concerned with a ceramic sealing material for use in electrical equipment.

The principal object of the present invention is to provide a material of good mechanical and electrical properties, that can be readily worked and assembled with elements of electrical equipment and upon heating will expand sealing the space in which mounted providing an electrical insulation therein.

A further and important object of the invention is to provide a material particularly suitable for forming an electrically insulating end seal in electrical heating elements and which material after being assembled into the heating element can be subjected to high temperatures whereupon it expands bonding itself to the element sealing the same and at the same time takes on the characteristics of glass.

Further objects of the invention will be in part obvious and in part pointed out in the following description.

A composition in accordance with the present invention consists of kaolin, silica, and zirconium silicate as its principal ingredients with various fluxes added. Said fluxes may be added to a mixture of the above ingredients as oxides of sodium, calcium and boron in combination or may be other flux compositions which will produce the same or similar chemical composition in the final product.

The amount of each of said principal ingredients should not extend beyond or below the following critical range for each, namely:

| | Percent |
|---|---|
| Kaolin | 20 to 30 |
| Silica | 20 to 30 |
| Zirconium silicate | 30 to 40 |

The amount of each of said fluxes in the mixture should be within the range indicated below, namely:

| | Percent |
|---|---|
| Sodium oxide | .6 to .9 |
| Calcium oxide | 2.4 to 3.2 |
| Boron oxide | 3.8 to 5.6 |

The above percentages are given as a proportion by weight of the total amount of all the ingredients in the mixture.

The following is an example of one mixture forming a composition according to the invention:

| | Percent |
|---|---|
| Kaolin | 28 |
| Silica | 27 |
| Zirconium silicate | 37 |
| Sodium silicate ($Na_2SiO_2$) | .7 |
| Calcium carbonate ($CaCO_3$) | 2.6 |
| Boron oxide ($B_2O_3$) | 5.1 |
| | 100.4 |

Other combinations of said principal ingredients and fluxes within the prescribed limits can equally as well be employed.

The ceramic composition is produced by mixing the proper amounts of principal ingredients and fluxes and forming by conventional manufacturing methods such as dust or dry pressing, wet or hydraulic pressing, extrusion or casting. The ceramic thus produced can be machined into desired shapes either in the leather hard, semi-moist or dry condition. The machined product is heated to below 1800° F. to shrink the same to its maximum density. The ceramic is then assembled with the elements of the electrical equipment in which it is used, for example an electrical heating element and thereafter being subjected to temperatures of approximately 1800° F. it expands and upon further heating to 2000° F. will fuse together and take on the characteristics of glass providing a seal and electrical insulation for the electrical elements.

The composition and method of forming same are capable of considerable modification and such changes thereto as come within the scope of the appended claims are deemed to be parts of the invention.

I claim:
1. A ceramic material for forming an expanded glass-like seal upon being heated above 1800° F. but below 2000° F., consisting of a mixture of 20 to 30% kaolin, 20 to 30% silica, 30 to 40% zirconium silicate, and a flux including the combination of the oxides of sodium, calcium and boron.

2. A ceramic product for forming an expandible glass-like insulator and seal between electrical heating elements upon being heated from 1800 up to but not above 2000° F. consisting of a mixture of 20 to 30% kaolin, 20 to 30% silica, 30 to 40% zirconium silicate, 0.6% to 0.9% sodium oxide, 2.4 to 3.2% calcium oxide, 3.8 to 5.6% boron oxide and said mixture being of a form for fitting the space to be sealed between said electrical elements prior to the heating thereof.

References Cited in the file of this patent

UNITED STATES PATENTS

| 1,370,276 | Buckman | Mar. 1, 1921 |
| 1,682,251 | Riddle | Aug. 28, 1928 |
| 2,351,128 | Jeffery | June 13, 1944 |
| 2,545,877 | Descarsin | Mar. 20, 1951 |
| 2,577,369 | Schurecht | Dec. 4, 1951 |
| 2,665,219 | Thurnauer et al. | Jan. 5, 1954 |
| 2,726,963 | Jackson | Dec. 13, 1955 |

FOREIGN PATENTS

| 121,628 | Australia | July 11, 1946 |
| 1,068,157 | France | Feb. 3, 1954 |

OTHER REFERENCES

Stiebitz et al.: German application Serial No. R11276, printed Feb. 2, 1956 (K 48 c 2), 2 pages spec.